(12) United States Patent
Park et al.

(10) Patent No.: US 9,885,920 B2
(45) Date of Patent: Feb. 6, 2018

(54) LIQUID CRYSTAL DISPLAY AND MANUFACTURING METHOD THEREOF

(71) Applicant: Samsung Display Co., Ltd., Yongin (KR)

(72) Inventors: Heung Shik Park, Seoul (KR); Ki Chul Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 233 days.

(21) Appl. No.: 14/823,648

(22) Filed: Aug. 11, 2015

(65) Prior Publication Data

US 2016/0147116 A1 May 26, 2016

(30) Foreign Application Priority Data

Nov. 20, 2014 (KR) .................... 10-2014-0162432

(51) Int. Cl.
*G02F 1/1337* (2006.01)
*G02F 1/137* (2006.01)
*G02F 1/139* (2006.01)

(52) U.S. Cl.
CPC ...... *G02F 1/133753* (2013.01); *G02F 1/1393* (2013.01); *G02F 1/13725* (2013.01);
(Continued)

(58) Field of Classification Search
CPC ......... G02F 1/133788; G02F 1/133753; G02F 1/133711; G02F 2001/133757; G02F 2001/133726
See application file for complete search history.

(56) References Cited

U.S. PATENT DOCUMENTS 4,917,475 A 4/1990 Meyer et al.
5,466,523 A 11/1995 Ogawa et al.
(Continued)

FOREIGN PATENT DOCUMENTS

EP 1 340 118 2/2011
KR 10-2007-0087683 8/2007
(Continued)

OTHER PUBLICATIONS

Komitov et al., "Alignment of cholesteric liquid crystals using periodic anchoring", Journal of Applied Physics, Oct. 1, 1999, pp. 3508-3511, vol. 86, No. 7, American Institute of Physics.
(Continued)

*Primary Examiner* — Timothy L Rude
(74) *Attorney, Agent, or Firm* — H.C. Park & Associates, PLC

(57) ABSTRACT

Disclosed is a liquid crystal display including: a first substrate; a second substrate facing the first substrate; a liquid crystal layer provided between the first substrate and the second substrate; and an alignment layer disposed at at least one of between the first substrate and the liquid crystal layer and between the second substrate and the liquid crystal layer, wherein the alignment layer includes a first region that is hydrophilic and a second region that is hydrophobic are periodically repeated in a direction that is parallel to the first substrate or the second substrate, and the liquid crystal layer includes liquid crystal molecules having a helical structure and a self-aligned liquid crystal additive to form a uniform lying helix (ULH) structure.

9 Claims, 8 Drawing Sheets

(52) U.S. Cl.
CPC .. *G02F 1/133703* (2013.01); *G02F 1/133711* (2013.01); *G02F 1/133788* (2013.01); *G02F 2001/133726* (2013.01); *G02F 2001/133738* (2013.01); *G02F 2001/133742* (2013.01); *G02F 2001/133757* (2013.01)

(56) References Cited

U.S. PATENT DOCUMENTS

| | | | |
|---|---|---|---|
| 7,544,400 | B2 | 6/2009 | Goulding et al. |
| 2005/0003110 | A1 | 1/2005 | Tanaka et al. |
| 2006/0017870 | A1* | 1/2006 | Nagata .............. G02F 1/133555 349/114 |
| 2006/0025626 | A1 | 2/2006 | Kohlstruk et al. |
| 2006/0256267 | A1 | 11/2006 | Bone et al. |
| 2007/0153190 | A1* | 7/2007 | Chen ................ G02F 1/133555 349/134 |
| 2007/0154655 | A1* | 7/2007 | Chae ...................... B82Y 30/00 428/1.2 |
| 2007/0182900 | A1* | 8/2007 | Hsiao ............... G02F 1/133555 349/128 |
| 2013/0182202 | A1 | 7/2013 | Graziano et al. |
| 2014/0071394 | A1 | 3/2014 | Umezawa et al. |
| 2015/0070640 | A1 | 3/2015 | Park et al. |
| 2015/0116643 | A1* | 4/2015 | Suh ................... G02F 1/133788 349/123 |
| 2015/0268493 | A1* | 9/2015 | Hong .................... G02F 1/1393 349/123 |

FOREIGN PATENT DOCUMENTS

| | | |
|---|---|---|
| KR | 10-2013-0110172 | 10/2013 |
| WO | 2011/036568 | 3/2011 |
| WO | 2012/038026 | 3/2012 |

OTHER PUBLICATIONS

Carbone et al., "Uniform Lying Helix Alignment on Periodic Surface Relief Structure Generated via Laser Scanning Lithography", Mol. Crystl. Liq. Cryst., 2011, pp. 37-49, vol. 544.

Carbone et al., "Short pitch cholesteric electro-optical device based on periodic polymer structures", Applied Physics Letter, Jul. 6, 2009, pp. 011102-1-011102-3, vol. 95. American Institute of Physics.

The Extended European Seach Report dated Jan. 7, 2016, in European Patent Application No. 15190186.5.

\* cited by examiner

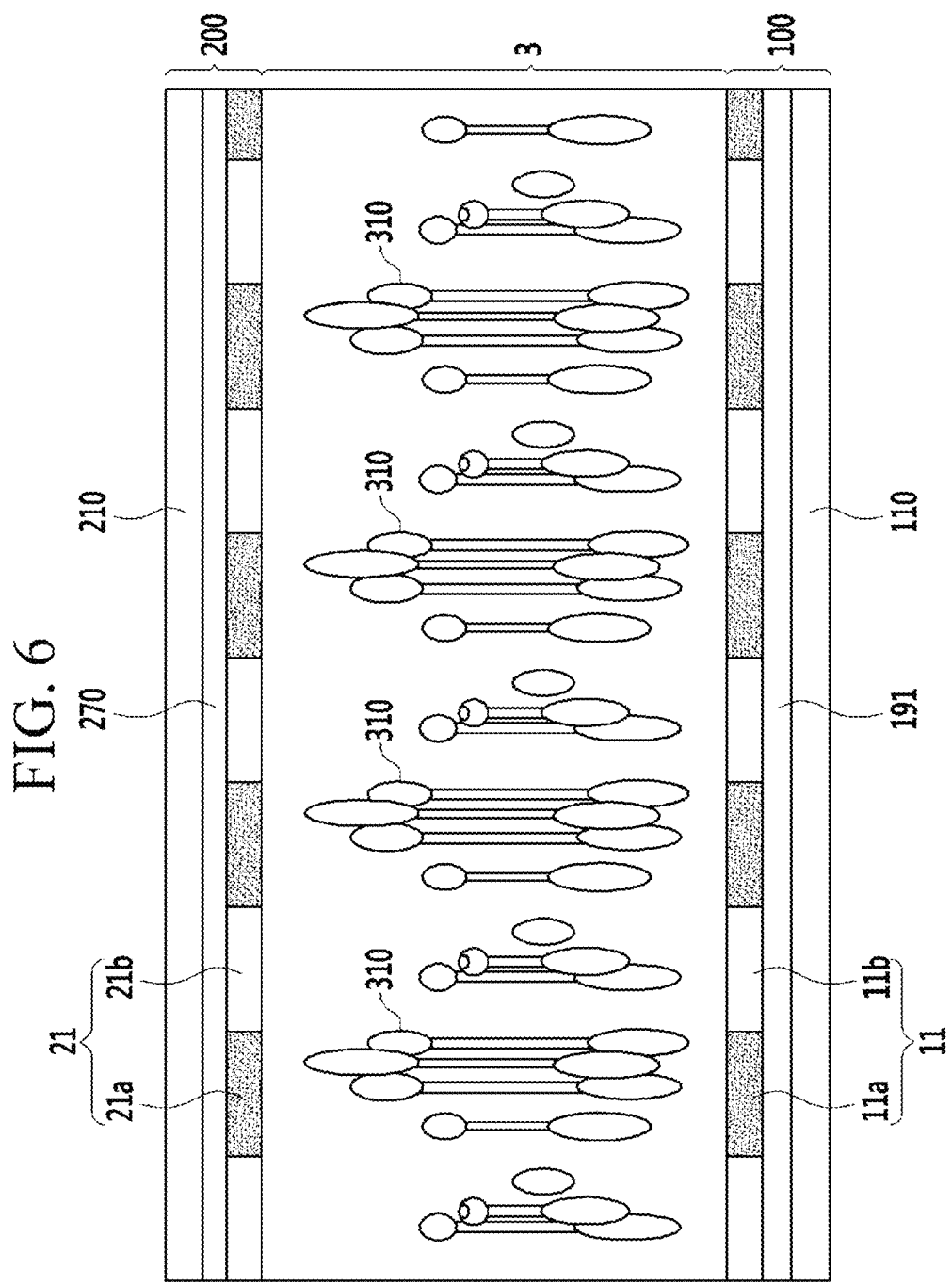

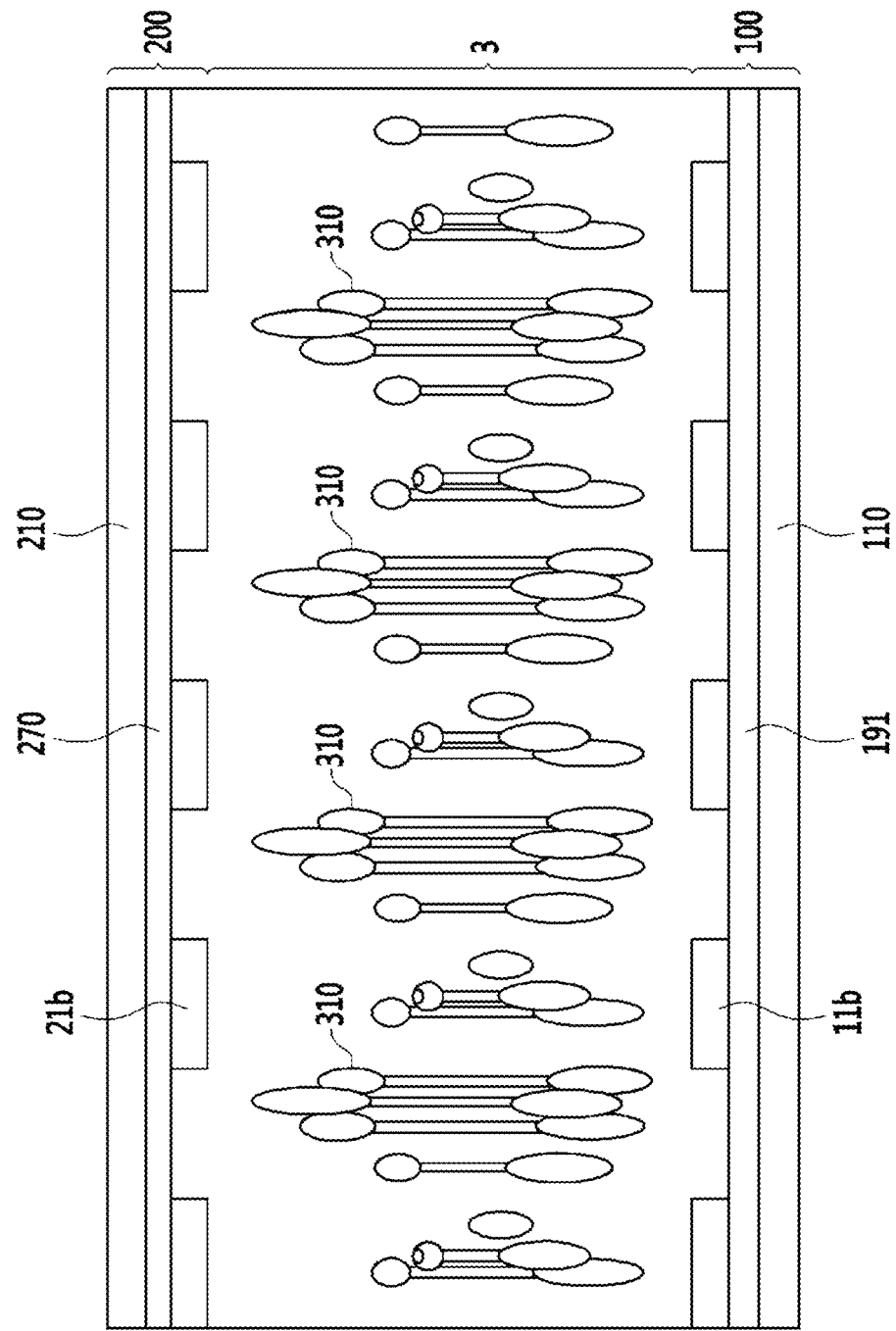

LIQUID CRYSTAL DISPLAY AND MANUFACTURING METHOD THEREOF

CROSS-REFERENCE TO RELATED APPLICATION

This application claims priority from and the benefit of Korean Patent Application No. 10-2014-0162432, filed on Nov. 20, 2014, which is hereby incorporated by reference for all purposes as if fully set forth herein.

BACKGROUND

Field

Exemplary embodiments relate to a liquid crystal display and a manufacturing method thereof.

Discussion of the Background

A liquid crystal display is currently one of the most used flat panel displays, and it is configured with two sheets of display panels facing each other, a liquid crystal layer provided therebetween, and a field generating electrode such as a pixel electrode or a common electrode provided on at least one of the display panels.

A liquid crystal display applies a voltage to the field generating electrodes to generate an electric field to the liquid crystal layer, which changes liquid crystal molecule alignments in the liquid crystal layer. The alignment changes control polarization of incident light, thereby displaying an image.

The liquid crystal display uses electro-optical modes such as a twisted nematic (TN) mode, a super twisted nematic (STN) mode, a vertically aligned nematic (VAN) mode, a patterned ITO vertically aligned nematic (PVA) mode, a polymer stabilized vertically aligned nematic (PSVA) mode, and a multi-domain vertically aligned nematic (MVA) mode. The above-noted modes use electric fields that are substantially perpendicular to a substrate and a liquid crystal layer, respectively. The modes further include electro-optical modes for using an electric field that is substantially parallel to the substrate and the liquid crystal layer, for example, an in-plane switching (IPS) mode and a fringe field switching (FFS) mode.

In addition to the display modes, a new liquid crystal display mode for using cholesteric liquid crystal having a relatively short cholesteric pitch has been proposed. The new liquid crystal display mode uses a flexo-electric effect, and the cholesteric liquid crystal in the new liquid crystal display device is aligned according to a uniformly lying helix (ULH) arrangement. However, this new mode has some problems, and particularly find difficulties in acquiring uniform alignment that is needed for the electro-optical characteristic.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display for allowing uniform alignment in a ULH-mode liquid crystal display, and a manufacturing method thereof.

Additional aspects will be set forth in the detailed description which follows, and, in part, will be apparent from the disclosure, or may be learned by practice of the inventive concept.

According to exemplary embodiments, a liquid crystal display comprises: a first substrate; a second substrate facing the first substrate; a liquid crystal layer provided between the first substrate and the second substrate; and an alignment layer disposed at at least one of between the first substrate and the liquid crystal layer and between the second substrate and the liquid crystal layer, wherein the alignment layer includes a first region that is hydrophilic and a second region that is hydrophobic are periodically repeated in a direction that is parallel to the first substrate or the second substrate, and the liquid crystal layer includes liquid crystal molecules having a helical structure and a self-aligned liquid crystal additive to form a uniform lying helix (ULH) structure.

According to exemplary embodiments, a method for manufacturing a liquid crystal display, comprises: forming a transparent electrode on a first substrate; forming an alignment layer on the transparent electrode; disposing a second substrate facing the first substrate; and forming a liquid crystal layer disposed between the first substrate and the second substrate, wherein the alignment layer is formed so that a first region that is hydrophilic and a second region that is hydrophobic may be periodically repeated in a direction that is parallel to the first substrate or the second substrate, and the liquid crystal layer includes liquid crystal molecules having a helical structure and a self-aligned liquid crystal additive and forms a uniform lying helix (ULH) structure.

According to the embodiments of the present invention, a response characteristic of milliseconds is realized by implementing the ULH-mode liquid crystal display.

According to the embodiments of the present invention, the uniform lying helix (ULH) structure is formed by adding a self-aligned liquid crystal additive to the liquid crystal layer including liquid crystal molecules in a helical structure, and forming the alignment layer structure in which a hydrophilic region and a hydrophobic region are alternately provided.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6 shows a side view for showing alignment of liquid crystal molecules in a liquid crystal display according to an exemplary embodiment of the present invention.

FIG. 7 shows a side view for showing alignment of liquid crystal molecules in a liquid crystal display according to an exemplary embodiment of the present invention.

DETAILED DESCRIPTION OF THE ILLUSTRATED EMBODIMENTS

Figure 1:
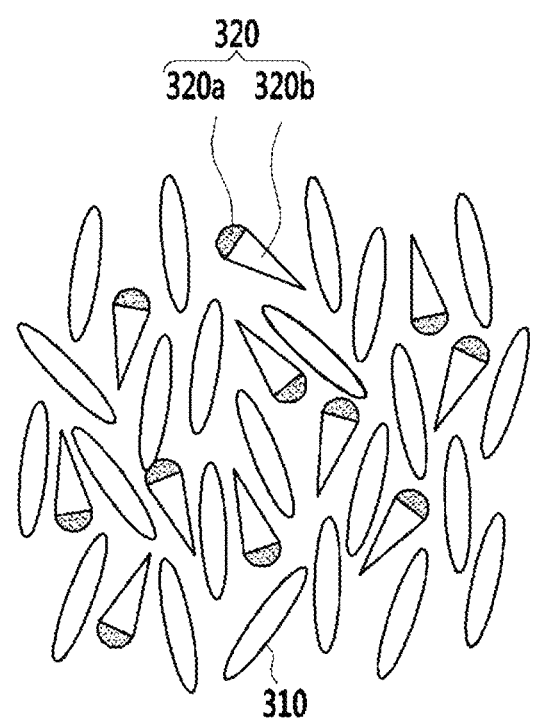
FIG. 1 shows a mixed state of liquid crystal molecules and a self-aligned liquid crystal additive in a liquid crystal layer according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification.

In a liquid crystal display according to an exemplary embodiment of the present invention, a liquid crystal layer includes liquid crystal molecules in a helical structure and a self-aligned liquid crystal additive. The liquid crystal layer including liquid crystal molecules in a helical structure forms an uniform lying helix (ULH) structure by allowing a helical axis and an optic axis to be arranged in parallel with the substrate and perpendicular to a periodic hydrophilic/hydrophobic pattern by the self-aligned additive and the periodic hydrophilic/hydrophobic pattern.

The liquid crystal molecules may be cholesteric, and the cholesteric liquid crystal may be a liquid crystal mixture generated by adding a chiral component for inducing a spiral structure to nematic liquid crystal. The liquid crystal molecules have a relatively big flexoelectric constant and a relatively small dielectric constant so when an electric field is applied in a vertical direction with respect to the helical axis, the direction of the helical axis is not changed but a molecular director is distorted, changing a gradient of the optic axis. The gradient of the optic axis may change transmittance of the liquid crystal layer provided between crossed polarizers.

The liquid crystal molecules according to the present exemplary embodiment may be a compound expressed in Formula 1.

R1—RD1—Sp—RD2—R2    Formula 1

In Formula 1, R1 and R2 are independently H, F, Cl, CN, and NCS, or straight or branched C1 to C25 alkyl groups that are non-substituted or single/multiple-substituted by a halogen or CN.

RD1 and RD2 are mesogenic groups respectively, and the mesogenic groups are rigid compounds.

RD1 and RD2 may be independently selected from Formulae IIa to IIo and their mirror images.

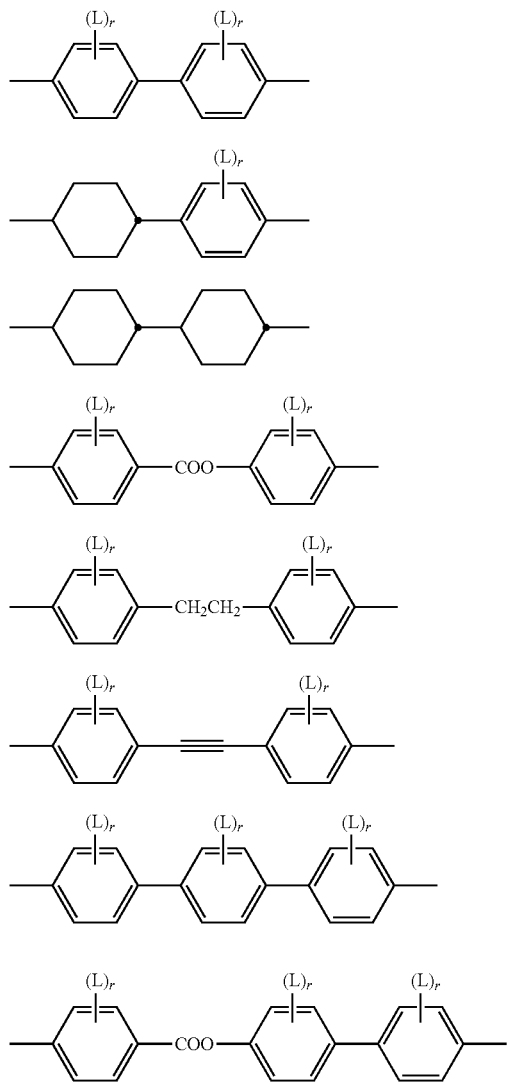

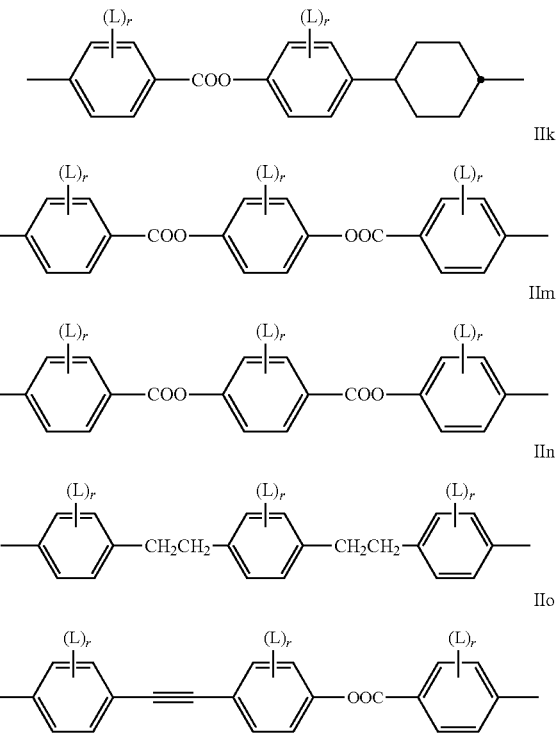

In Formulae IIa to IIo, L is independently F, Cl, CN, OH, or $NO_2$, or C1 to C7 alkyl group, an alkoxy group, or an alkane oil group that is randomly fluorinated, and r is independently 0, 1, 2, 3, or 4.

In the case of a compound having a non-polar group, R1 and R2 of Formula 1 are desirably an alkyl group having less than C15 or a C2 to C15 alkoxy group. When R1 or R2 is replaced with an alkyl or alkoxy radical, that is, when an end $CH_2$ group is replaced with —O—, it may be straight or branched. It is desirably a C2, C3, C4, C5, C6, C7, or C8 straight type, and for example, it is desirably ethyl, propyl, butyl, pentyl, hexyl, heptyl, octyl, ethoxy, propoxy, butoxy, pentoxy, hexoxy, heptoxy, or octoxy, and for another example, it is desirably a methyl, nonyl, decyl, undecyl, dodecyl, tridecyl, tetradecyl, pentadecyl, nonoxy, decoxy, undecoxy, dodecoxy, tridecoxy, or tetradecoxy. When an oxyalkyl that is a CH2 group is replaced with —O—, for example, it is desirably a straight 2-oxypropyl (=methoxymethyl), 2-oxybutyl (=ethoxymethyl), or 3-oxybutyl (=2-methoxyethyl), 2-, 3-, or 4-oxypentyl, 2-, 3-, 4-, or 5-oxyhexyl, 2-, 3-, 4-, 5-, or 6-oxyheptyl, 2-, 3-, 4-, 5-, 6-, or 7-oxyoctyl, 2-, 3-, 4-, 5-, 6-, 7-, or 8-oxynonyl, or 2-, 3-, 4-, 5-, 6-, 7-, 8- or 9-oxydecyl.

In the case of a compound with an end polar group, R1 and R2 are selected from CN, NO2, a halogen, OCH3, OCN, SCN, CORx, or COORx, or a C1 to C4 mono-, oligo-, or poly-fluorinated alkyl or alkoxy group. Rx is randomly a C1 to C4 fluorinated alkyl group, and desirably a C1 to C3 fluorinated alkyl group. The halogen is desirably F or Cl.

Regarding Formula 1, R1 and R2 are desirably selected from H, F, Cl, CN, NO2, OCH3, COCH3, COC2H5, COOCH3, COOC2H5, CF3, C2F5, OCF3, OCHF2, and OC2F5, particularly H, F, Cl, CN, OCH3, and OCF3, and more particularly H, F, CN, and OCF3.

Sp is —CH$_{2o}$—, and o is an integer from 5 to 40. Here, at least one non-end CH$_2$ group not neighboring another may be replaced with —O—, —S—, —NH—, —N CH3—, —CO—, —COO—, —OCO—, —OCOO—, —S—CO—, —CO—S—, —CH=CH—, —CH=CF—, —CF=CF—, or —C≡C—.

Regarding R1, R2, and Sp, an end CH$_2$ group is directly coupled to RD1 or RD2, and a non-end CH$_2$ group is not directly coupled to RD1 or RD2.

For example, the compound expressed in Formula 1 may be expressed as a compound expressed in Formulae 1-1 to 1-17.

Formula 1-1
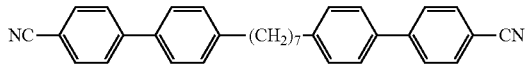

Formula 1-2
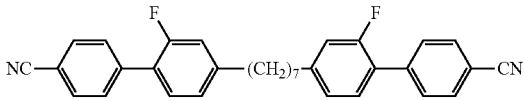

Formula 1-3
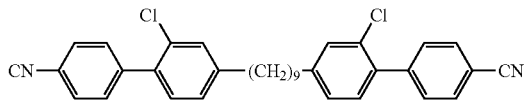

Formula 1-4
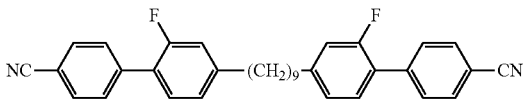

Formula 1-5
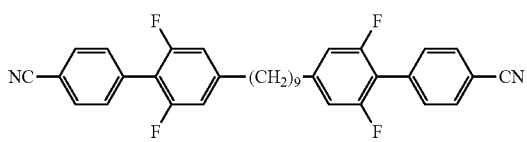

Formula 1-6
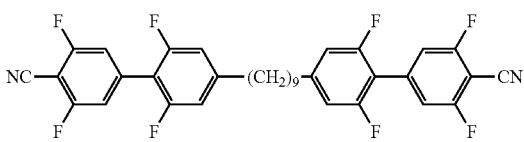

Formula 1-7
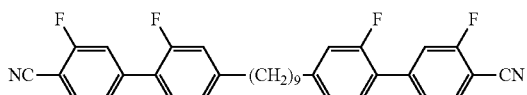

Formula 1-8
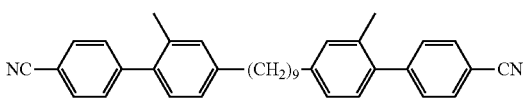

Formula 1-9
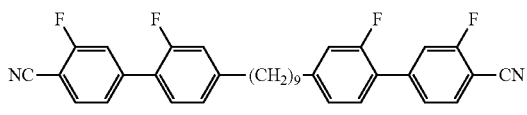

Formula 1-10
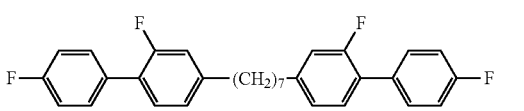

Formula 1-11

Formula 1-12
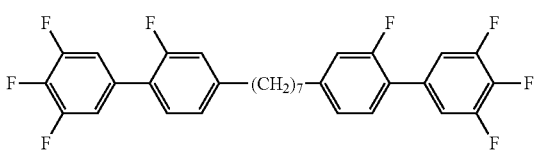

Formula 1-13
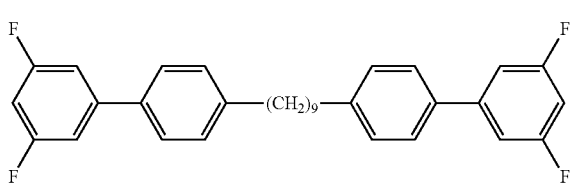

Formula 1-14
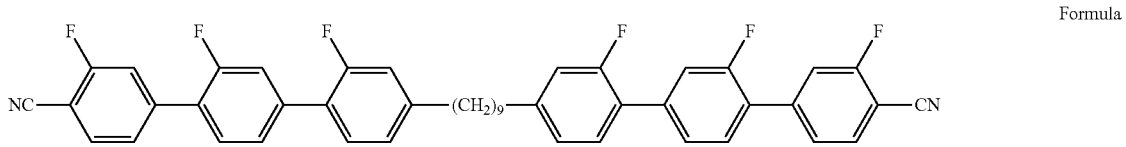

Formula 1-15
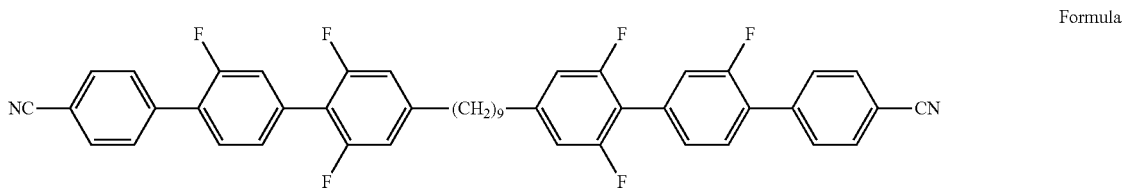

Formula 1-16

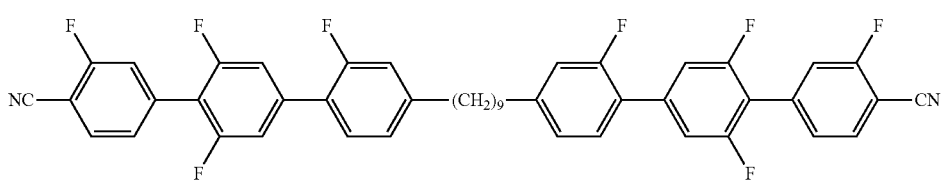

Formula 1-17

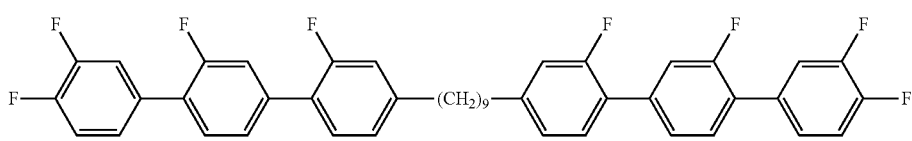

The liquid crystal molecules according to the exemplary embodiment of the present invention correspond to an example of the liquid crystal molecules having a relatively big flexoelectric constant and a relatively small dielectric constant for forming a uniform lying helix (ULH) structure, and any kinds of liquid crystal materials that are configured with a material to show the flexoelectric effect such as a bimesogen that two rigid dimers are connected with each other by a chain including the alkyl group are transformable in various ways.

The self-aligned liquid crystal additive according to the exemplary embodiment of the present invention includes a center portion and end groups connected to the center portion. The self-aligned liquid crystal additive may be mixed with the liquid crystal molecules. The self-aligned liquid crystal additive interacts with an alignment layer that meets the liquid crystal layer and determines an alignment state of the liquid crystal molecules. The self-aligned liquid crystal additive may be included in the liquid crystal layer at about 0.001 wt % to 10 wt %.

Regarding the self-aligned liquid crystal additive, the center portion includes an aromatic, heteroaromatic, alicyclic, or heterocyclic ring, one of the two end groups includes a hydrophilic group, and the other includes a hydrophobic group. In detail, the self-aligned liquid crystal additive may have a polar component having atoms selected from N, O, S, and P as a hydrophilic group. The self-aligned liquid crystal additive is a compound expressed in Formulae 2-1 to 2-16, and is not limited thereto.

Formula 2-1

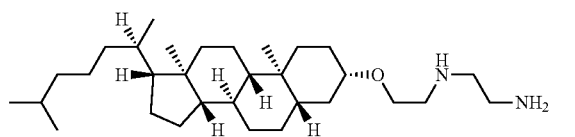

Formula 2-2

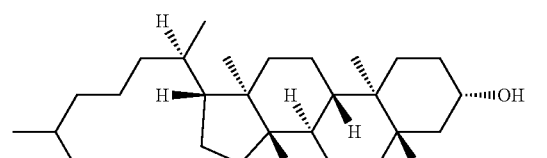

Formula 2-3

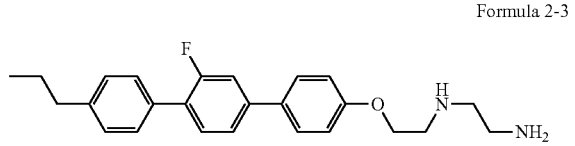

Formula 2-4

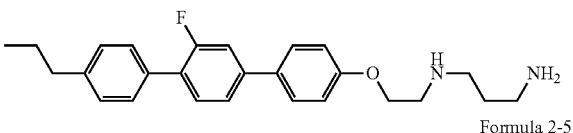

Formula 2-5

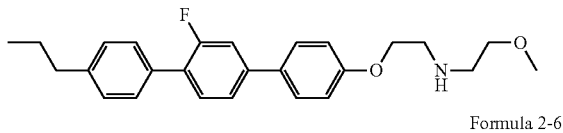

Formula 2-6

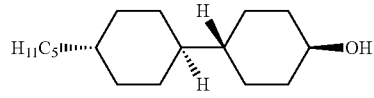

Formula 2-7

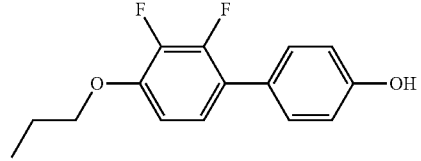

Formula 2-8

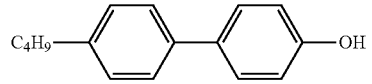

Formula 2-9

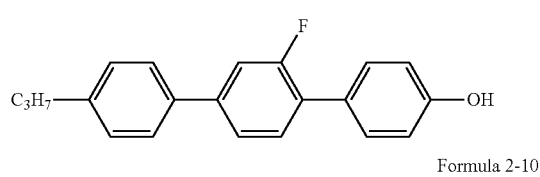

Formula 2-10

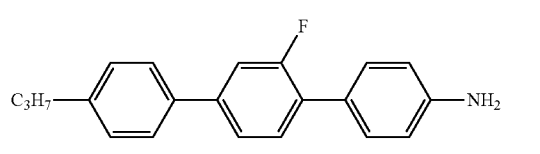

Formula 2-11

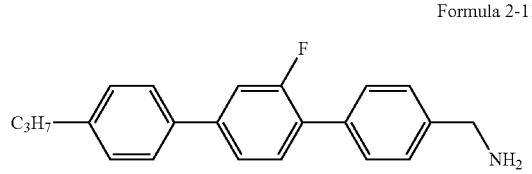

-continued

Formula 2-12

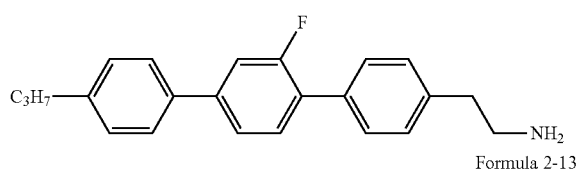

Formula 2-13

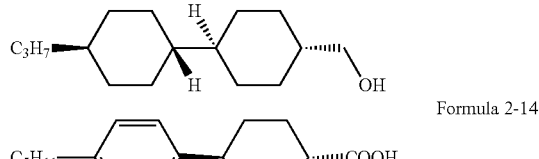

Formula 2-14

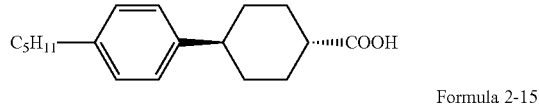

Formula 2-15

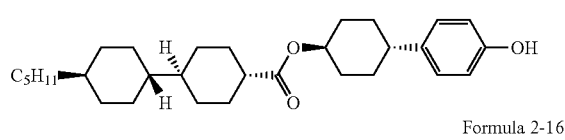

Formula 2-16

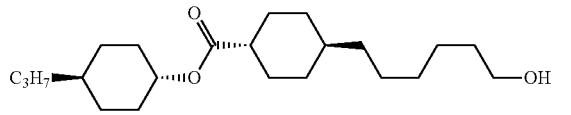

Desirably, the self-aligned liquid crystal additive includes a first end group including a biphenyl or 2 to 3 benzenes, a center portion such as a cyclohexane ring, a hydrophilic group such as —OH or —NH2, and a second end group including an alkylene group (—(CH$_{2n}$—), where n is a natural number). However, without being restricted to the above-noted self-aligned liquid crystal additive structure, any kinds of structures including a center portion and two end groups connected to the center portion in which one of the two end groups includes a hydrophilic group and the other includes a hydrophobic group are modifiable in various ways.

The self-aligned liquid crystal additive may include one to three hydrophilic groups. For example, the self-aligned liquid crystal additive may be a compound expressed in Formula 2-17.

Formula 2-17

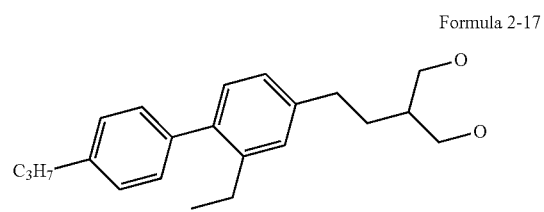

The liquid crystal layer may further include a reactive mesogen. The reactive mesogen is a compound that may be polymerized, and its response time may be improved by irradiating ultraviolet rays and forming a pretilt while the electric field is applied or while the same is not applied. The reactive mesogen may be a compound expressed in Formulae RM-1 to RM-6, and it is not restricted thereto.

RM-1

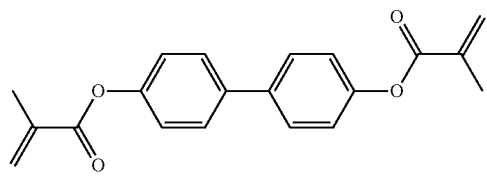

RM-2

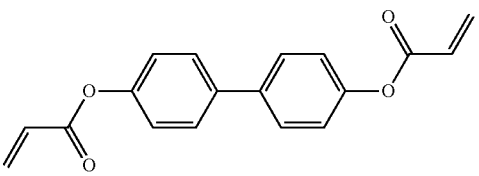

RM-3

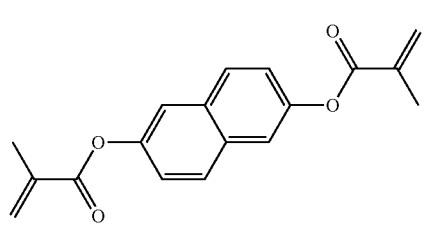

RM-4

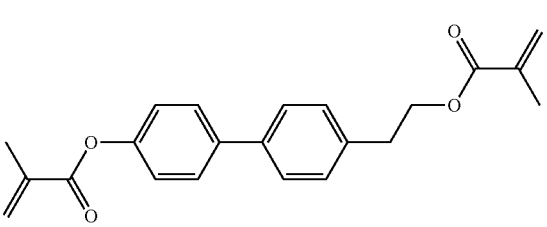

RM-5

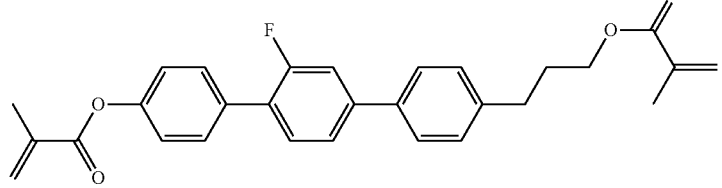

RM-6

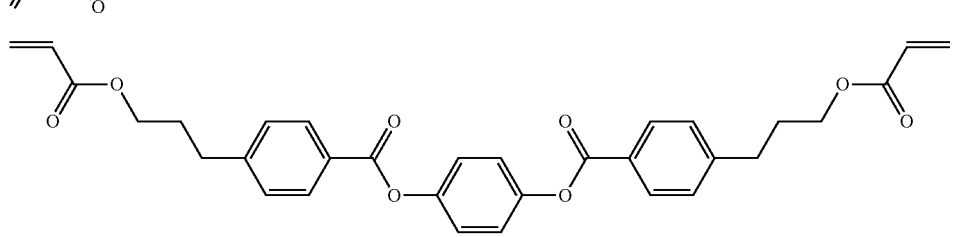

Regarding the liquid crystal display according to the present exemplary embodiment, the liquid crystal molecules having a helical structure may realize a stable alignment state when the horizontal and vertical alignments are alternately well performed. An alignment layer structure for the liquid crystal molecule to show an alignment state in the liquid crystal display according to an exemplary embodiment of the present invention will now be described.

Figure 2:
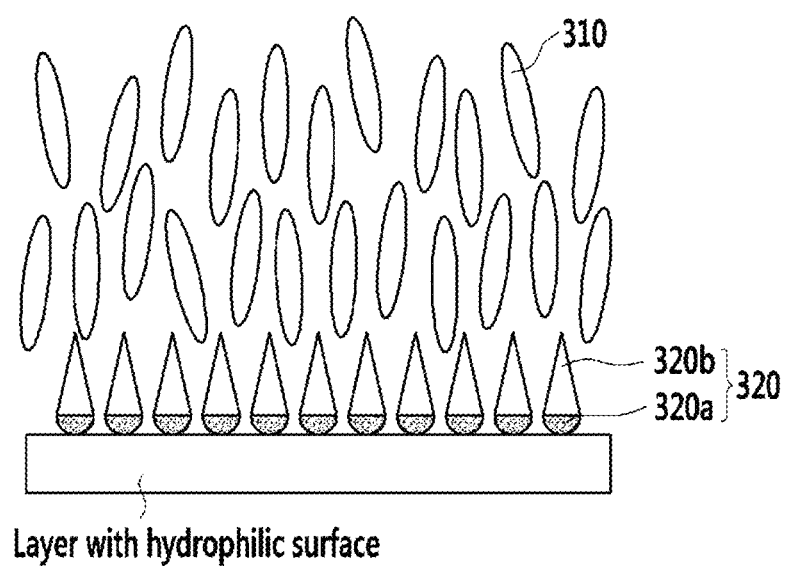
FIG. 2 shows an arranged state of liquid crystal molecules and a self-aligned liquid crystal additive in a liquid crystal layer according to an exemplary embodiment of the present invention.

FIG. 1 shows a mixed state of liquid crystal molecules and a self-aligned liquid crystal additive in a liquid crystal layer according to an exemplary embodiment of the present invention. FIG. 2 shows an arranged state of liquid crystal molecules and a self-aligned liquid crystal additive in a liquid crystal layer according to an exemplary embodiment of the present invention.

Referring to FIG. 1, the liquid crystal molecules 310 have a relatively big flexoelectric constant and a relatively small dielectric constant and have a helical structure, and the self-aligned liquid crystal additive 320 is mixed with the liquid crystal molecules 310. The self-aligned liquid crystal additive 320 includes a hydrophilic group 320a and a hydrophobic group 320b which are connected by a ring center portion (not shown). The self-aligned liquid crystal additive 320 may have a similar structure to the liquid crystal molecule, and may be homogeneously mixed with the liquid crystal molecules without phase separation at room temperature.

Referring to FIG. 2, the self-aligned liquid crystal additive 320 is physically coupled to a layer having a hydrophilic surface by hydrophilic interaction of the hydrophilic group 320a and the hydrophilic surface. In this instance, the hydrophilic group 320a may be aligned toward the layer having a hydrophilic surface in a homeotropic manner. An alignment force of the self-aligned liquid crystal additive 320 is substantially influenced by a physical property of the surface of a layer material that meets the self-aligned liquid crystal additive 320. In detail, when the interaction of the self-aligned liquid crystal additive 320 and the layer surface is big, the self-aligned liquid crystal additive 320 is aligned on the layer surface in a homeotropic manner, when the interaction is small, the liquid crystal molecule 310 is homogeneously mixed with the self-aligned liquid crystal additive 320, and the self-aligned liquid crystal additive 320 is aligned on the layer surface in a planar manner with the liquid crystal molecules.

Figure 3:
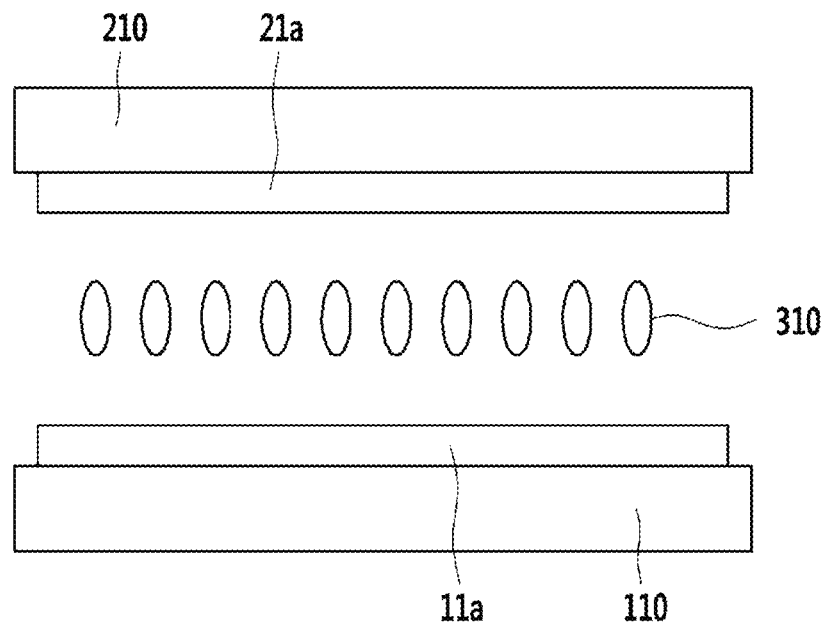
FIG. 3 shows a cross-sectional view for showing alignment of liquid crystal molecules when an inorganic layer is formed on substrates facing each other.

FIG. 3 shows a cross-sectional view for showing an alignment of liquid crystal molecules when an inorganic layer is formed on substrates facing each other.

Referring to FIG. 3, a silicon nitride layer 11a that is an inorganic layer is formed on a first substrate 110, and a silicon nitride layer 21a is formed on a second substrate 210 facing the first substrate 110. A liquid crystal layer is formed between the first substrate 110 and the second substrate 210. In this instance, the liquid crystal layer includes liquid crystal molecules 310 having a helical structure and a self-aligned liquid crystal additive (not shown). The liquid crystal molecules 310 having a helical structure and the self-aligned liquid crystal additive (not shown) have already been described. The silicon nitride layers 11a and 21a meeting the liquid crystal layer are hydrophilic so the self-aligned liquid crystal additive is aligned in the silicon nitride layers 11a and 21a in a substantially homeotropic manner, and the liquid crystal molecules 310 are substantially vertically aligned in the liquid crystal layer.

Figure 4:
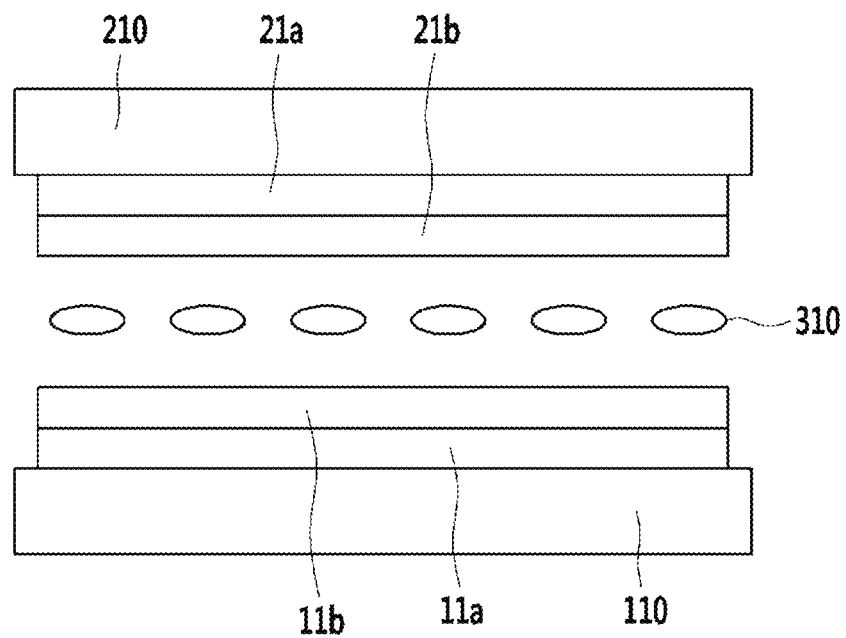
FIG. 4 shows a cross-sectional view for showing alignment of liquid crystal molecules when an organic layer is formed on substrates facing each other.
Figure 5:
FIG. 5 shows an image for showing an aligned state of liquid crystal molecules of FIG. 4.

FIG. 4 shows a cross-sectional view for showing an alignment of liquid crystal molecules when an organic layer is formed on substrates facing each other. FIG. 5 shows an image for showing an aligned state of liquid crystal molecules of FIG. 4.

Referring to FIG. 4, a silicon nitride layer 11a that is an inorganic layer is formed on a first substrate 110, and an organic layer 11b is formed on the silicon nitride layer 11a. A silicon nitride layer 21a is formed on a second substrate 210 facing the first substrate 110, and an organic layer 21b is formed on the silicon nitride layer 21a. A liquid crystal layer is formed between the first substrate 110 and the second substrate 210. Here, the liquid crystal layer includes liquid crystal molecules 310 having a helical structure and a self-aligned liquid crystal additive (not shown). The organic layers 11b and 21b meeting the liquid crystal layer are hydrophobic so the self-aligned liquid crystal additive is aligned to the organic layers 11b and 21b in a substantially planar manner. Accordingly, the liquid crystal molecules 310 are aligned in a substantially planar manner in the liquid crystal layer, which is confirmed from an image of FIG. 5.

FIG. 6 shows a side view for showing an alignment of liquid crystal molecules in a liquid crystal display according to an exemplary embodiment of the present invention.

Referring to FIG. 6, the liquid crystal display includes a first display panel 100 and a second display panel 200 facing each other, and a liquid crystal layer 3 provided between the first display panel 100 and the second display panel 200.

Regarding the first display panel 100, a first electrode 191 is provided on the first substrate 110, and a first alignment layer 11 is provided on the first electrode 191. Gate lines, data lines, various kinds of elements such as thin film transistors connected thereto, and insulating layers for performing insulation between layers are formed between the first substrate 110 and the first electrode 191. The first electrode 191 may be a transparent electrode such as ITO or IZO and may be formed to be a whole plate that is not torn apart.

Regarding the second display panel 200, a second electrode 270 is provided on a second substrate 210, and a second alignment layer 21 is provided on a second electrode 270. A color filter, a black matrix, and an overcoat layer may be formed between the second substrate 210 and the second electrode 270. However, the constituent elements such as the color filter and the black matrix may be formed on the first display panel 100. The second electrode 270 may be a transparent electrode such as ITO or IZO, and may be formed to be a whole plate that is not torn apart.

Regarding the alignment layers 11 and 21, hydrophilic first regions 11a and 21a and hydrophobic second regions 11b and 21b are periodically and repeatedly arranged in a direction in parallel with the first substrate 110 or the second substrate 210. Surfaces of the first regions 11a and 21a meeting the liquid crystal layer 3 may be inorganic layers, and surfaces of the second regions 11b and 21b may be organic layers. The inorganic layer and the organic layer forming the alignment layers 11 and 21 may be disposed at a same layer.

The liquid crystal layer 3 includes liquid crystal molecules 310 having a helical structure and a self-aligned liquid crystal additive (not shown). The liquid crystal molecules 310 in the liquid crystal layer 3 corresponding to the first regions 11a and 21a are aligned in a substantially homeotropic manner, and the liquid crystal molecules 310 in the liquid crystal layer 3 corresponding to the second regions 11b and 21b are aligned in a substantially planar manner. The hydrophilic first regions 11a and 21a and the hydrophobic second regions 11b and 21b are periodically and repeatedly arranged so the liquid crystal molecules 310 provided to correspond to the respective regions may be substantially periodically and repeatedly aligned vertically/horizontally with respect to the first substrate 110. In this instance, the uniform lying helix (ULH) structure is formed by arranging the helical axis and the optic axis of the liquid crystal molecules 310 to be parallel with the first substrate 110 and be perpendicular to the direction in which a periodic pattern is extended (i.e., the direction entering the drawing in FIG. 6).

Therefore, without using an alignment material such as a conventional polyimide, the liquid crystal display in the uniform lying helix (ULH) mode is formed by forming the alignment layer structure in which the hydrophilic property and the hydrophobic property are periodically repeated, mixing the liquid crystal molecules and the self-aligned liquid crystal additive, and realizing the periodically repeated vertical/horizontal alignments according to the exemplary embodiment of the present invention. In this instance, the helical axis may be aligned in one direction.

In another exemplary embodiment, the alignment layers 11 and 21 are formed by organic layers, and portions that correspond to the first regions 11a and 21a are plasma-processed with oxygen so that they may be hydrophilic. The gas including the oxygen used in the plasma processing includes $O_2$, $O_3$, NO, $N_2O$, CO, and $CO_2$.

FIG. 7 shows a side view for showing an alignment of liquid crystal molecules in a liquid crystal display according to an exemplary embodiment of the present invention.

Referring to FIG. 7, most of the configuration corresponds to that of the exemplary embodiment of FIG. 6, transparent electrodes 191 and 270 such as ITO or IZO are formed on the first substrate 110 and the second substrate 210, and periodically patterned hydrophobic layers 11b and 21b are formed on the transparent electrodes 191 and 270. The transparent electrodes 191 and 270 are inorganic layers and function to be hydrophilic, and the hydrophobic layers 11b and 21b are formed thereon so that the hydrophilic region and the hydrophobic region are periodically repeated in the direction that is planar to the substrates 110 and 210.

Figure 8A:
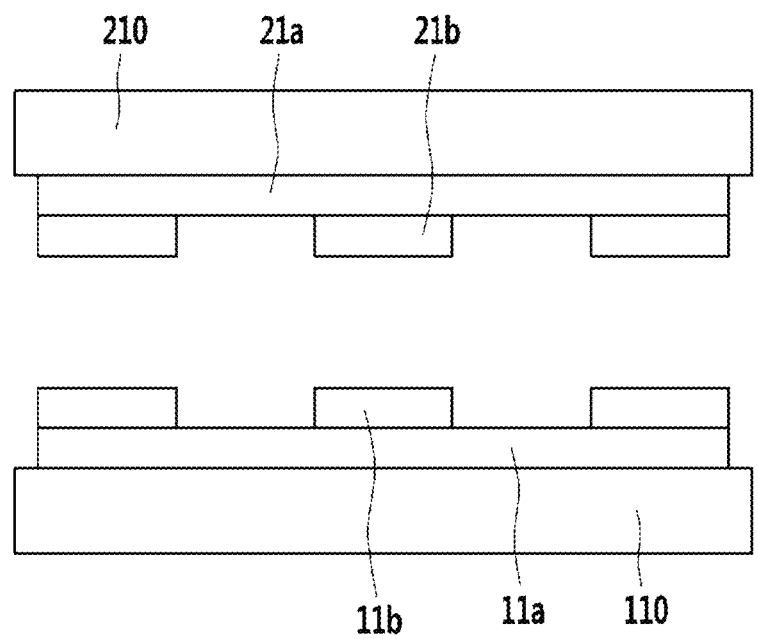
FIG. 8A and FIG. 8B show a cross-sectional view for showing a method for manufacturing a liquid crystal display according to an exemplary embodiment of the present invention.
Figure 8B:
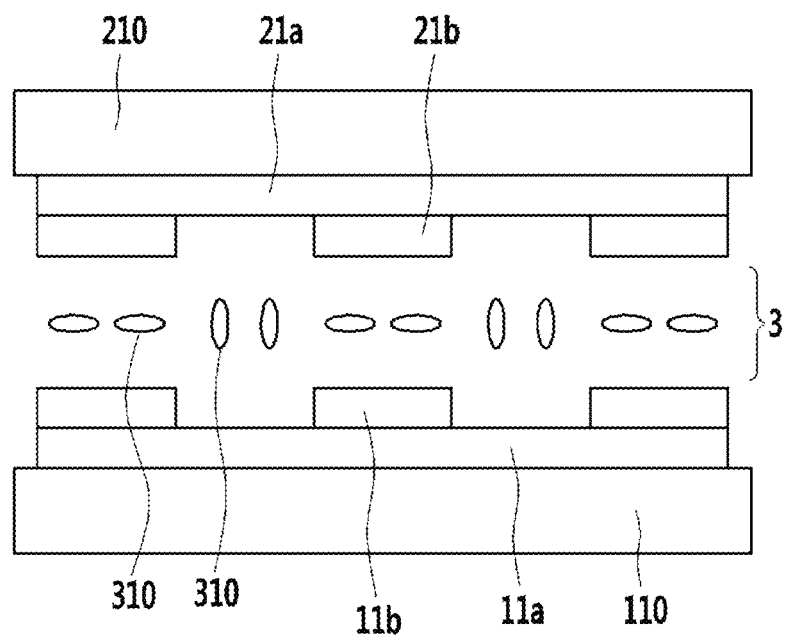

FIG. 8A and FIG. 8B show a cross-sectional view for showing a method for manufacturing a liquid crystal display according to an exemplary embodiment of the present invention.

Referring to FIG. 8A, a silicon nitride layer 11a that is an inorganic layer is formed on a first substrate 110, and an organic layer 11b is formed on the silicon nitride layer 11a. A silicon nitride layer 21a is formed on a second substrate 210 facing the first substrate 110, and an organic layer 21b is formed on the silicon nitride layer 21a. Here, the organic layers 11b and 21b may be periodically patterned to expose the inorganic layers 11a and 21a that meet the liquid crystal layer. And then referring to FIG. 8B, A liquid crystal layer 3 including liquid crystal molecules 310 with a helical structure and a self-aligned liquid crystal additive (not shown) and having the uniform lying helix (ULH) structure is formed between the first substrate 110 and the second substrate 210. A patterning process thereof may be a photo-process.

The formed liquid crystal display has the structure in which the inorganic layer 11a, 21a and the organic layer 11b, 21b are periodically repeated on the surface meeting the liquid crystal layer, so the structure in which the vertical/horizontally alignments of the liquid crystal molecules 310 are periodically repeated may be realized in a like manner of the exemplary embodiment described with reference to FIG. 6. Here, a transparent electrode may be formed at at least one of between the first substrate 110 and the inorganic layer 11a and between the second substrate 210 and the inorganic layer 21a.

In another exemplary embodiment, an organic layer may be formed on the first substrate 110 and the second substrate 210, an inorganic layer may be formed on the organic layer, and the inorganic layer may be periodically patterned. In this instance, the inorganic layer may be exposed to the liquid crystal layer between the neighboring organic layers. The surface meeting the liquid crystal layer has the structure in which the inorganic layer and the organic layer are periodically and repeatedly arranged in the exemplary embodiment so the display has a structure that vertical/horizontal alignments of the liquid crystal molecules repeat themselves periodically.

As described, the method for manufacturing a liquid crystal display according to an exemplary embodiment of the present invention alternately forms the hydrophilic and hydrophobic regions through a simple patterning process, and realizes the structure in which vertical/horizontal alignments are periodically repeated in the ULH mode thereby increasing alignment stability.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:
   a first substrate;
   a second substrate facing the first substrate;
   a liquid crystal layer between the first substrate and the second substrate; and
   an alignment layer disposed at least one of between the first substrate and the liquid crystal layer and between the second substrate and the liquid crystal layer,
   wherein the alignment layer comprises:
      a first region that is hydrophilic; and
      a second region that is hydrophobic,
         wherein the first region and the second region are periodically repeated in a direction that is parallel to the first substrate or the second substrate, and
         wherein the liquid crystal layer comprises:
   liquid crystal molecules having a helical structure; and
   a self-aligned liquid crystal additive to form a uniform lying helix (ULH) structure.

2. The liquid crystal display of claim 1, wherein
   in the first region, a layer surface meeting the liquid crystal layer includes an inorganic layer, and
   in the second region, a layer surface meeting the liquid crystal layer includes an organic layer.

3. The liquid crystal display of claim 2, wherein
   the alignment layer includes an inorganic layer and an organic layer disposed at a same layer, and
   the inorganic layer and the organic layer are periodically and repeatedly arranged in a direction that is parallel to the first substrate or the second substrate.

4. The liquid crystal display of claim 1, wherein
   the alignment layer includes an organic layer, and
   the first region includes a plasma-processed hydrophilic region.

5. The liquid crystal display of claim 1, wherein
   the self-aligned liquid crystal additive includes a center portion and two end groups connected to the center portion, and
   one of the two end groups includes a hydrophilic group.

6. The liquid crystal display of claim 5, wherein
the self-aligned liquid crystal additive is disposed to neighbor the alignment layer surface of the first region and is vertically aligned, and is disposed to neighbor the alignment layer surface of the second region and is horizontally aligned.

7. The liquid crystal display of claim 6, wherein
The liquid crystal display includes vertically aligned liquid crystal molecules at a portion of the liquid crystal layer corresponding to the first region, and horizontally aligned liquid crystal molecules at a portion of the liquid crystal layer corresponding to the second region.

8. The liquid crystal display of claim 1, further comprising:
a transparent electrode disposed at least one of between the alignment layer and the first substrate and between the alignment layer and the second substrate,
wherein the transparent electrode is formed to be a whole plate.

9. The liquid crystal display of claim 1, wherein
the liquid crystal layer further includes a reactive mesogen.

* * * * *